United States Patent
Nam et al.

(10) Patent No.: US 7,142,293 B2
(45) Date of Patent: Nov. 28, 2006

(54) OPTICAL SYSTEM FOR AUTOMATIC LENS METER

(75) Inventors: Ki-Jun Nam, Daejeon (KR); Sang-Jun Han, Daejeon (KR)

(73) Assignee: Potec Co., Ltd., Daejeon (KR)

( * ) Notice: Subject to any disclaimer, the term of this patent is extended or adjusted under 35 U.S.C. 154(b) by 196 days.

(21) Appl. No.: 10/960,025

(22) Filed: Oct. 8, 2004

(65) Prior Publication Data

US 2006/0077378 A1   Apr. 13, 2006

(51) Int. Cl.
*G01B 9/00* (2006.01)
(52) U.S. Cl. .................. 356/124; 356/127
(58) Field of Classification Search ......... 356/124–127
See application file for complete search history.

(56) References Cited

U.S. PATENT DOCUMENTS

| | | | |
|---|---|---|---|
| 4,275,964 A | 6/1981 | Vassiliadis | |
| 4,410,268 A | 10/1983 | Tamaki | |
| 4,641,961 A | 2/1987 | Yamada | |
| 4,779,979 A * | 10/1988 | Iwane | 356/125 |
| 4,826,315 A | 5/1989 | Kohayakawa | |
| 4,828,385 A | 5/1989 | Fukuma et al. | |
| 5,231,460 A | 7/1993 | Kohayakawa | |

FOREIGN PATENT DOCUMENTS

JP         404269640 A  *  9/1992

* cited by examiner

Primary Examiner—Hoa Q. Pham
(74) Attorney, Agent, or Firm—Staas & Halsey LLP

(57) ABSTRACT

An optical system for an automatic lens meter for measuring the refractive power of a lens to be examined. The optical system includes a light source for generating a measuring light beam, a convex collimator lens, disposed a predetermined focal distance from the light source, for collimating the measuring light beam, so that the light beam move in parallel, an expanding concave lens, disposed downstream of a lens to be examined, for expanding the measuring light beam with respect to an optic axis, a plural-apertures stop, disposed downstream of the expanding concave lens and formed with a plurality of apertures along the circumference thereof at predetermined angular intervals, for separating the measuring light beam into a plurality of measuring light beams, a prism lens in which a convex lens and a fixed prism assembly are integrally formed, disposed directly downstream of the plural-apertures stop, having the convex lens to focus the plural measuring light beams passed through the plural-apertures stop, and the same number of prisms as the number of the plural apertures to deflect the focused light beams so as to maintain the light beams in the separated beams, and an image forming lens, disposed downstream of the prism lens, for forming aperture images of the measuring light beams, passed through the prism lens, on a two-dimensional sensor array.

2 Claims, 3 Drawing Sheets

Fig.1 PRIOR ART
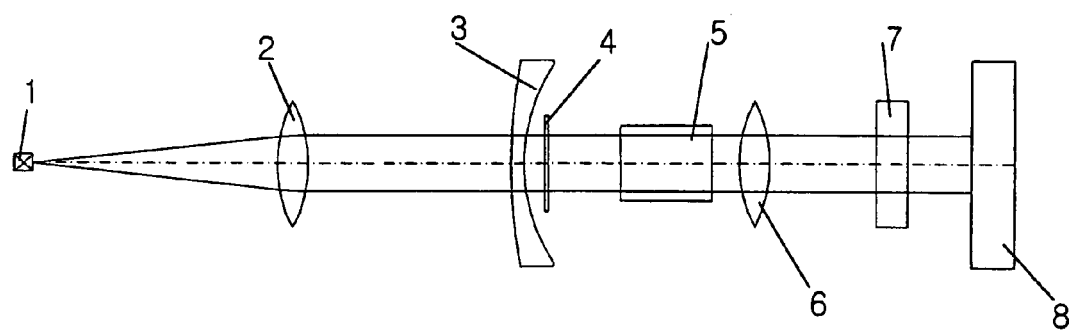
Fig.2 PRIOR ART
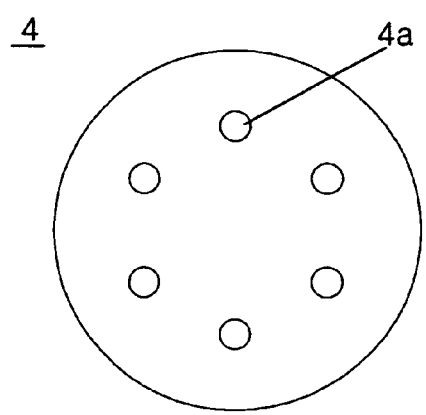

OPTICAL SYSTEM FOR AUTOMATIC LENS METER

BACKGROUND OF THE INVENTION

1. Field of the Invention

The present invention relates to an optical system for an automatic lens meter to measure the refractive power of a lens, and more particularly to an optical system for an automatic lens meter to measure the refractive power of a lens by arranging a concave lens for expanding a light beam downstream of the lens to be examined so that the expanded light beams pass through apertures and then clear images are formed on a sensor array, whereby it is easy to manufacture optical parts and convenient to assemble the optical system for an automatic lens meter.

2. Description of the Related Art

As well known to those skilled in the art, a conventional optical system used in an automatic lens meter to measure the refractive power (diopter) of a lens, as shown in FIGS. 1 and 2, includes a light source 1 for generating an examining light beam for measuring the refractive power of a lens, a collimator lens 2, disposed upstream of the lens to be examined, for converting the generated light beam into parallel light beams to enter the lens to be examined, a plural-apertures stop 4, formed with several apertures 4a (usually, 4 to 6 apertures) and disposed downstream of the lens 3 to be examined, for separating the parallel light beams, focused or diverged depending on the refractive power of the lens 3 to be examined and transmitted through the lens 3 to be examined, at a predetermined angle, a prism 5, disposed downstream of the plural-apertures stop 4, for rotating and deflecting the light beams transmitted through the plural-apertures stop 4, a convex lens 6 for focusing the light beams transmitted through the prism 5 on a sensor array 8, and a cylindrical concave lens 7 for expanding the light beams transmitted through the convex lens 6 in a direction perpendicular to the direction of arrangement of the sensor array 8.

In a refractive power measuring apparatus including the conventional optical system constructed as described above, an examiner fixes the lens 3 to a lens holder disposed upstream of the plural-apertures stop 4. The examiner measures the refractive power of the lens 3 by adjusting the optical center of the lens 3 to align it on the center of a computer screen, that is, an optic axis of the lens meter by moving the lens 3 while viewing the computer screen.

The light beam emitted from the light source is converted into parallel light beams, by the collimator lens 2, which then enter the lens 3. The parallel light beams pass through the lens 3, are focused or diverged depending upon the refractive power of the lens 3, so as to be separated into a plurality of light beams equal to the number of the apertures 4a, by passing through the plural apertures 4a formed at the plural-apertures stop 4.

The light beam for measuring is separated by the apertures separately penetrating the plural-apertures stop 4 at predetermined angular intervals, while passing through the plural-apertures stop 4, and passes through the prism 5. The separated light beams for measuring are rotated and deflected in the normal direction of a one-dimensional sensor array 8. The light beams pass through the convex lens 6 for focusing images and the cylindrical concave lens 7 disposed at the rear of the convex lens 6, sequentially. The light beams for measuring pass through the cylindrical concave lens 7 and form images on the sensor array 8. The examiner viewing the computer screen measures the refractive power of the lens 3 by aligning the central axes of the images formed on the sensor array 8 with the optic axes of the lens meter.

For the purpose of arranging images formed by the six light beams, having passed through the plural-apertures stop 4 and separated every 60 degrees, on the one-dimensional sensor array 8, the conventional optical system for the automatic lens meter, constructed as described above, uses the rotating function of the prism 5 to rotate the light beams, deviated from the normal direction of the sensor array 8, to be aligned with the normal direction of the sensor array 8. The conventional optical system for the automatic lens meter uses the deflecting function of the prism 5 and the cylindrical concave lens 7 in order to maintain uniform distances between the images arranged on the sensor array 8.

In order to manufacture the prism 5 for rotating and deflecting the light beams, since the same number of triangle-shaped prisms as the number of apertures must be arranged at each location so that they are aligned with each aperture, and since respective incident surfaces and light-emitting surfaces of the triangle-shaped prisms must be kept at a predetermined angle, the structure of the optical system is complex and it is difficult to manufacture components of the optical system.

Further, since, the cylindrical concave lens 7 must be used in order that the light beams for measuring reach the sensor array 8 even if the light beams for measuring travel in the tangential direction perpendicular to the normal direction of the sensor array 8, and since the optic axes of the light beams for measuring must constantly be aligned with the normal direction of the sensor array 8, operational efficiency deteriorates due to the long time required to assemble the optical system, and manufacturing costs are high due to the large number of parts.

More particularly, since very small apertures must be formed in order that the light beams pass through the plural-apertures stop 4 and form precise images of the apertures on the sensor array 8, the cost to manufacture the plural-apertures stop 4 increases. In the event that foreign matter is attached to the very small apertures 4a, since the images are not formed on the sensor array 8, or since the image signal may be seriously inferior, it is difficult to precisely measure the refractive power of the lens 3 to be examined.

SUMMARY OF THE INVENTION

Therefore, the present invention has been made in view of the above problems, and it is an object of the present invention to provide an optical system for an automatic lens meter that can be rapidly assembled by simplifying the optical system components thereof, and whose manufacturing cost is reduced and productivity is enhanced by manufacturing the components easily.

It is another object of the present invention to provide an optical system for an automatic lens meter for stably and precisely measuring the refractive power of a lens to be measured by increasing the size of apertures to minimize the influence of foreign matter on the aperture images formed on the sensor array.

In accordance with the present invention, the above and other objects can be accomplished by the provision of an optical system for an automatic lens meter including a light source for generating a measuring light beam, a convex collimator lens disposed a predetermined focal distance from the light source, for collimating the measuring light beam generated from the light source, so that the light beam move in parallel after passing through the convex collimator lens, an expanding concave lens disposed downstream of a lens to be examined, for expanding the measuring light beam, having passed through the lens to be examined, with respect to an optic axis, a plural-apertures stop disposed downstream of the expanding concave lens and formed with a plurality of apertures along the circumference thereof at predetermined regular angles, for separating the measuring light beam, having passed through the expanding concave lens, into a plurality of measuring light beams, a prism lens disposed directly downstream of the plural-apertures stop and having a convex lens for focusing the plural measuring light beams passed through the plural-apertures stop onto the optic axis, and the same number, as the number of the plural apertures, of prisms integrally formed with the convex lens, and an image forming lens disposed downstream of the prism lens, for forming aperture images of the measuring light beams, passed through the prism lens, on a two-dimensional sensor array.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view illustrating a conventional optical system for an automatic lens meter;

FIG. 2 is a front view showing a plural-apertures stop of the optical system in FIG. 1;

DESCRIPTION OF THE PREFERRED EMBODIMENTS

Hereinafter, the structure and operation of an optical system for an automatic lens meter according to the present invention will be described in detail with reference to the accompanying drawings.

Figure 3:
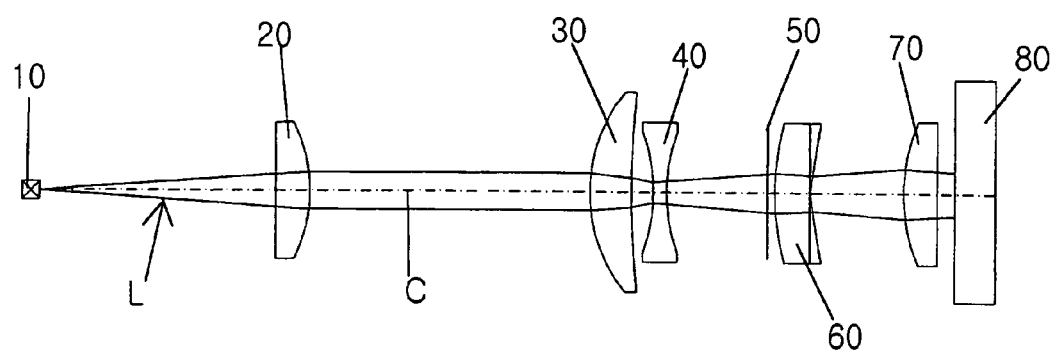
FIG. 3 is a schematic view illustrating an optical system for an automatic lens meter according to the present invention.
Figure 4:
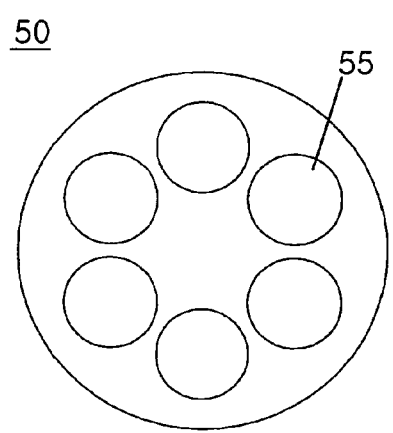
FIG. 4 is a front view showing a plural-apertures stop of the optical system of the present invention.

FIG. 3 is a schematic view illustrating the installed state of the whole optical system according to the present invention, and FIG. 4 is a front view of a plural-apertures stop 50 of the optical system according to the present invention.

As shown in FIG. 3, the optical system for an automatic lens meter according to the present invention includes a light source 10 for generating a light beam L for measuring, a collimator lens 20, disposed at a predetermined focal distance from the light source 10, for collimating the light beam L generated from the light source 10 to enter a lens 30 to be examined in parallel, an expanding concave lens 40, disposed downstream of the lens 30, for expanding the light beam L passed through the lens 30 with respect to an optic axis C, and a plural-apertures stop 50, formed with six penetrating apertures 55 along the circumference of the plural-apertures stop 50 at predetermined angular intervals, for separating the light beam L expanded with respect to the optic axis C. The optical system for an automatic lens meter further includes a prism lens 60, disposed downstream of the plural-apertures stop 50, and provided with the same number of prisms as the number of the apertures 55, for deflecting the separated light beams L, having passed through the respective apertures 55 of the plural-apertures stop 50, to be diverged about the optic axis C and for preventing the images formed by the separated light beams L, having passed through the respective apertures 55, from interfering with each other, and an image forming convex lens 70, disposed downstream of the prism lens 60, for forming the images of the aperture by the separated light beams L, having passed the prism lens 60 on a two-dimensional sensor array 80.

Among the components of the optical system for an automatic lens meter according to the present invention, the apertures 55 penetrating the plural-apertures stop 50, as shown in FIG. 4, are more than three times the size of the apertures of the conventional apertures stop so as to prevent dust or foreign matter, attached to the plural-apertures stop 50, from causing the aperture images to disappear or become dim and thus causing the image signals to be inaccurately sensed, when the aperture images are formed on the sensor array 80.

Figure 5:
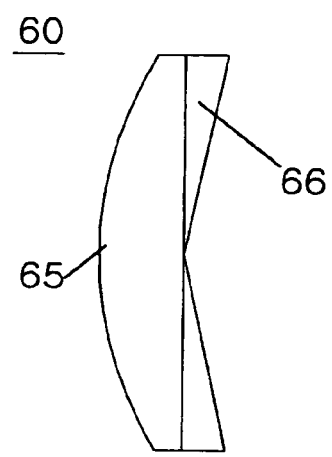
FIGS. 5 and 6 are a side view and a rear view showing a prism lens of the optical system according to the present invention.

Moreover, as shown in FIG. 5, the prism lens 60 employed in the optical system according to the present invention is provided with a convex lens 65 at the front side thereof where the separated light beams L enter, to be focused. The same number of separated prisms 66, as the number of the apertures 55, integrally formed with the convex lens 65 at a rear side thereof is formed, so that the optical system for an automatic lens meter can be easily assembled.

Figure 6:
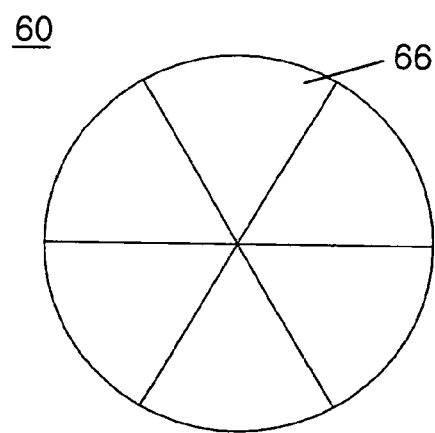

The number of the prisms 66 provided at the rear side of the convex lens 65, as shown in FIG. 6, is the same as the number of the apertures 55, so that the separated light beams L for measuring, having passed through the apertures 55, pass through the corresponding prisms 66, respectively. The same number, as the number of the apertures 55, of respective prisms 66 deflect the separated light beams L so that they are diverged from the optic axis C.

Moreover, the plural-apertures stop 50 and the prism lens 60 for separating the light beam L for measuring into plural separated light beams L are disposed proximal to each other, so as to prevent the plural separated light beams L from interfering with each other.

Hereinafter, the operation of the optical system for an automatic lens meter according to the present invention constructed as described above, will be described.

As shown in FIG. 3, the light beam L for measuring generated from the light source 10 is collimated while passing through the convex collimator lens 20 and then reaches the lens 30, of which refractive power is examined.

The light beam L for measuring is focused or diverged by the lens 30 depending on the refractive power of the lens 30 as it passes through the lens 30. The light beam L, having passed through the lens 30, is expanded in the direction divergent from the optic axis C while passing through the expanding concave lens 40 disposed downstream of the lens 30 to be examined, and then is transmitted to the plural-apertures stop 50 disposed downstream of the expanding concave lens 40. The light beam L expanded by the expanding concave lens 40 is separated into a plurality of light beams by passing through the plural-apertures stop 50 in which a plurality of apertures 55 penetrate at the predetermined angular intervals on the circumference thereof.

Since the light beam L enters the plural-apertures stop 50 by being expanded by the expanding concave lens 40 disposed upstream of the plural-apertures stop 50, the distance between the aperture images on the sensor array 80 formed by the light beam L, having passed through the apertures 55, is increased. Since the optical system for an automatic lens meter according to the present invention offers a margin sufficient to increase the size of the apertures 55, it can remove the inconvenience of forming the very small apertures of the conventional optical system for an automatic lens meter. Thus, it is possible to enhance productivity of the plural-apertures stop 50 and to reduce the cost of the components. The overlap of the aperture images on the two-dimensional sensor array 80, finally formed by the light beams L, when examining a convex lens having a high refractive power, can be prevented.

Moreover, since the distance between the aperture images formed on the sensor array 80 can be increased by the expanding concave lens 40 so as to enlarge the sizes of the apertures 55 formed on the plural-apertures stop 50, dust or foreign matter attached to the periphery of the apertures 55 does not affect the images of the apertures formed on the image forming convex lens 70. As such, an optical system capable of precisely measuring the refractive power of a lens to be examined by precisely forming the aperture images, can be provided.

The plural light beams L separated by the plural-apertures stop 50 enter the prism lens 60, in which the convex lens 65 and the prisms 66 are integrally formed. The light beams L incident on the prism lens 60 are stably focused by the convex lens 65 disposed on the incident plane of the prism lens 60, and are deflected in the direction divergent from the optic axis C by the plural prisms 66, disposed at the rear side of the convex lens 65, corresponding to the six apertures 55 formed on the plural-apertures stop 50.

The light beams L, having passed through the prism lens 60, form the images on the two-dimensional sensor array 80 while passing through the image forming convex lens 70. The images formed on the two-dimensional sensor array 80 are used to calculate the refractive power of the lens to be examined through a processing device connected to the sensor array 80.

As described above, the optical system for an automatic lens meter according to the present invention overcomes the inconvenience experienced due to the very small apertures of the plural-apertures stop having diameters less than 0.2 mm in the conventional optical system, so that the refractive power of the lens to be examined can be measured precisely.

In other words, since the apertures 55 formed on the plural-apertures stop 50, employed in the optical system for an automatic lens meter according to the present invention, are formed to have a diameter of 0.6 mm to 1 mm, about three times the greater than 0.2 mm diameter of the apertures in the conventional optical system, the optical system for an automatic lens meter according to the present invention prevents low productivity and high cost, caused by precisely manufacturing the very smaller sized apertures, so as to enhance the competitiveness of the automatic lens meter.

Further, in the optical system for an automatic lens meter according to the present invention, since the plural-apertures stop 50 is disposed proximal to the prism lens 60, disposed downstream of the plural-apertures stop 50, so that the light beams passed through the respective apertures 55 do not interfere with each other, the aperture images are precisely formed on the sensor array.

According to the optical system for an automatic lens meter of the present invention constructed as described above, since the light beam L is expanded by the expanding concave lens 40 so as to enter the plural-apertures stop 50, the size of the apertures, which was restricted in the conventional optical system, can be increased, so that the aperture images formed on the sensor array can be examined more precisely, the refractive power of the lens to be examined can be measured more precisely by minimizing the influence of dust or foreign matter on the aperture images formed on the sensor array.

According to the optical system for an automatic lens meter of the present invention, since the expanding concave lens is disposed downstream of the lens, whose refractive power is being measured, and, since the light beam expanded by the expanding concave lens passes through the plural-apertures stop, the size of the apertures is increased so as to form stable aperture images on the sensor array. Thus, the refractive power of a lens to be examined can be measured precisely. The simple structure of the optical system allows easy assembly of the optical system and reduces manufacturing costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical system for an automatic lens meter, comprising:
    a light source for generating a measuring light beam;
    a convex collimator lens, disposed at a predetermined focal distance from the light source, for collimating the measuring light beam generated from the light source to move in parallel after passing through the convex collimator lens;
    an expanding concave lens, disposed downstream of a lens to be examined, for expanding the measuring light beam passed through the lens to be examined with respect to an optic axis;
    a plural-apertures stop, disposed downstream of the expanding concave lens and formed with a plurality of apertures along the circumference thereof at predetermined angular intervals, for separating the measuring light beam, having passed through the expanding concave lens into a plurality of measuring light beams;
    a prism lens in which a convex lens and a fixed prism assembly are integrally formed, disposed directly downstream of the plural-apertures stop, having the convex lens to focus the plural measuring light beams passed through the plural-apertures stop, and the same number of prisms as the number of the plural apertures to deflect the focused light beams so as to maintain the light beams in the separated beams; and
    an image forming lens disposed downstream of the prism lens, for forming aperture images of the measuring light beams, passed through the prism lens, on a two-dimensional sensor array.

2. The optical system for an automatic lens meter as set forth in claim 1, wherein the apertures formed on the plural-apertures stop have diameters raging from 0.6 mm to 1 mm, and the plural-apertures stop is disposed proximally upstream of the prism lens.

* * * * *

UNITED STATES PATENT AND TRADEMARK OFFICE
CERTIFICATE OF CORRECTION

PATENT NO. : 7,142,293 B2 Page 1 of 1
APPLICATION NO. : 10/960025
DATED : November 28, 2006
INVENTOR(S) : Ki-Jun Nam et al.

It is certified that error appears in the above-identified patent and that said Letters Patent is hereby corrected as shown below:

Column 6, Line 60, change "raging" to --ranging--.

Signed and Sealed this

Twenty-seventh Day of March, 2007

JON W. DUDAS
*Director of the United States Patent and Trademark Office*